United States Patent
Whiton et al.

(10) Patent No.: US 6,924,056 B2
(45) Date of Patent: Aug. 2, 2005

(54) CASCADE FUEL INLET MANIFOLD FOR FUEL CELLS

(75) Inventors: John H. Whiton, South Windsor, CT (US); Torger J. Anderson, Manchester, CT (US); Robin J. Guthrie, East Hartford, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 10/960,843

(22) Filed: Oct. 7, 2004

(65) Prior Publication Data

US 2005/0042498 A1 Feb. 24, 2005

Related U.S. Application Data

(63) Continuation of application No. 10/269,654, filed on Oct. 10, 2002, now abandoned.

(51) Int. Cl.[7] .............................. H01M 8/04; H01M 8/06
(52) U.S. Cl. .............................. 429/38; 429/13; 429/39; 138/39; 138/42
(58) Field of Search .............................. 429/13, 38, 39; 138/37, 42, 39

(56) References Cited

U.S. PATENT DOCUMENTS 4,670,361 A * 6/1987 Tsutsumi et al. ............ 429/34
5,622,606 A * 4/1997 Kugler et al. ............ 204/192.12
6,159,629 A * 12/2000 Gibb et al. .................... 429/39
6,387,559 B1 * 5/2002 Koripella et al. ............. 429/34
6,502,530 B1 * 1/2003 Turlot et al. ............. 118/723 E

FOREIGN PATENT DOCUMENTS

JP      63200470 A   *  8/1988   ............ H01M/8/24

OTHER PUBLICATIONS

U.S. Appl. No. 09/921,809 filed Aug. 3, 2001.
U.S. Appl. No. 10/305,300 filed Nov. 26, 2002.
U.S. Appl. No. 10/305,301 filed Nov. 26, 2002.

* cited by examiner

Primary Examiner—Tracy Dove
(74) Attorney, Agent, or Firm—M. P. Williams

(57) ABSTRACT

Fuel is provided to an inlet (14) of a cascade region (15) which has a plurality of stages (17–23), each of which divides fuel flow evenly into a pair of corresponding slots (24–26). The flow is then spread across a floor surface (41) of a cascade exit header (40), the flow spreading into areas between the slots. The flow is then directed into an open cavity which is in fluid communication with the inlets of the fuel flow fields (12) of the fuel cells, reaching the fuel flow field inlets uniformly and simultaneously.

3 Claims, 3 Drawing Sheets

CASCADE FUEL INLET MANIFOLD FOR FUEL CELLS

CROSS REFERENCE TO RELATED APPLICATIONS

This application is a continuation of application Ser. No. 10/269,654, filed Oct. 10, 2002 now abandoned.

TECHNICAL FIELD

This invention relates to a fuel inlet manifold for fuel cells in which the fuel flow is evenly split a consecutive number of times, in a cascade fashion, and spread across the face of the fuel flow field inlets of the fuel cell stack, thereby to ensure uniform delivery of fuel simultaneously to all of the individual fuel cell fuel flow fields during startup or transient operation of a fuel cell stack.

BACKGROUND ART

Prior methods for creating flow uniformity consist primarily of diffusers that expand the flow over a large area or restrictive devices such as screens or orifice plates. The former incur a volume penalty because a gradual expansion is required to avoid flow mal-distribution from separation and "jetting" of the core flow. The latter force a flow redistribution across the exit plane and can be quite compact, but an unacceptable pressure loss is often required to create the necessary uniformity. Unacceptable mal-distributions of flow may also occur from localized "jetting" through the exit plane of the inlet flow distribution apparatus, requiring impingement plates or deflectors to improve the uniformity. These types of designs tend to be effective only at design point flow velocities and do not perform well over wide ranges of flows. Furthermore, in both diffuser and restrictive type devices, the requirement for simultaneous distribution and delivery of an inlet fluid element across the entire inlet manifold exit plane is not met because fluid from the inlet pipe crosses the manifold exit plane near the center of the flow field first. During transient conditions, e.g., ramping power up from, say, 50% to near 100% power, if the fuel flows are non-uniform, some cells will not get enough fuel, resulting in poor (possibly inadequate) fuel cell stack performance.

DISCLOSURE OF INVENTION

Objects of the invention include: provision of a PEM fuel cell fuel inlet which provides a rate of flow of fuel which is substantially uniform to the flow fields of all of the fuel cells in a fuel cell stack, and which delivers a substantially uniform amount of fuel substantially simultaneously to each of the flow fields in a fuel cell stack; substantially simultaneous provision of substantially equal amounts of fuel to all of the fuel flow fields of fuel cell stacks during start up and other transient fuel flow conditions; increasing the durability of fuel cell stacks; improved start up of fuel cells; improved fuel cell transient response; and improved fuel flow distribution in fuel cell stacks.

The invention is partially predicated on the recognition of the fact that although a simple pipe manifold that splits the flow into several, equal-length passages may partially resolve the aforementioned flow problems by delivering fluid to diverse locations across the exit plane, which may be effective in steady-state conditions, such a device has a volume penalty and does not resolve the issue of localized "jetting" unless it has an extremely large number of legs to distribute the flow with fine resolution.

According to the present invention, the fuel inlet flow control apparatus of a fuel cell evenly divides the fuel flow several times, successively, to provide a number of separate flows, and then spreads the flows, so as to distribute the fuel substantially uniformly across the entrances to all of the flow fields in the fuel cell stack, whereby fuel flow transients approach the fuel flow fields of all of the fuel cells in the stack at substantially the same flow rate and substantially simultaneously during start up and other transient fuel flow conditions. In a disclosed embodiment of the invention, a cascade region comprises several levels, the fuel being split and caused to flow in two separate directions at each level, whereby an initial singular flow results in a number of flows at cascade outlet passages, such as slots, said number, for instance being eight or sixteen, or any other suitable number. In this embodiment, the flow in the cascade outlet slots impinges on a flat surface which assists in directing the flow from the outlet slots uniformly across the flat surface (although the surface could be curved in other applications), and the flow direction is turned toward the inlets of the fuel cell fuel flow fields. An open fuel inlet cavity receives a uniform flow of fuel which approaches the entire extent of the cavity simultaneously, the fuel flow field inlets for each fuel cell being in fluid communication with the cavity, whereby changes in fuel flow reach all of the fuel cells simultaneously with substantially a uniform flow into all of the fuel cells in the stack.

The invention, through uniform distribution of fuel, also enhances performance during normal operation of a fuel cell stack, especially during fuel flow transients.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
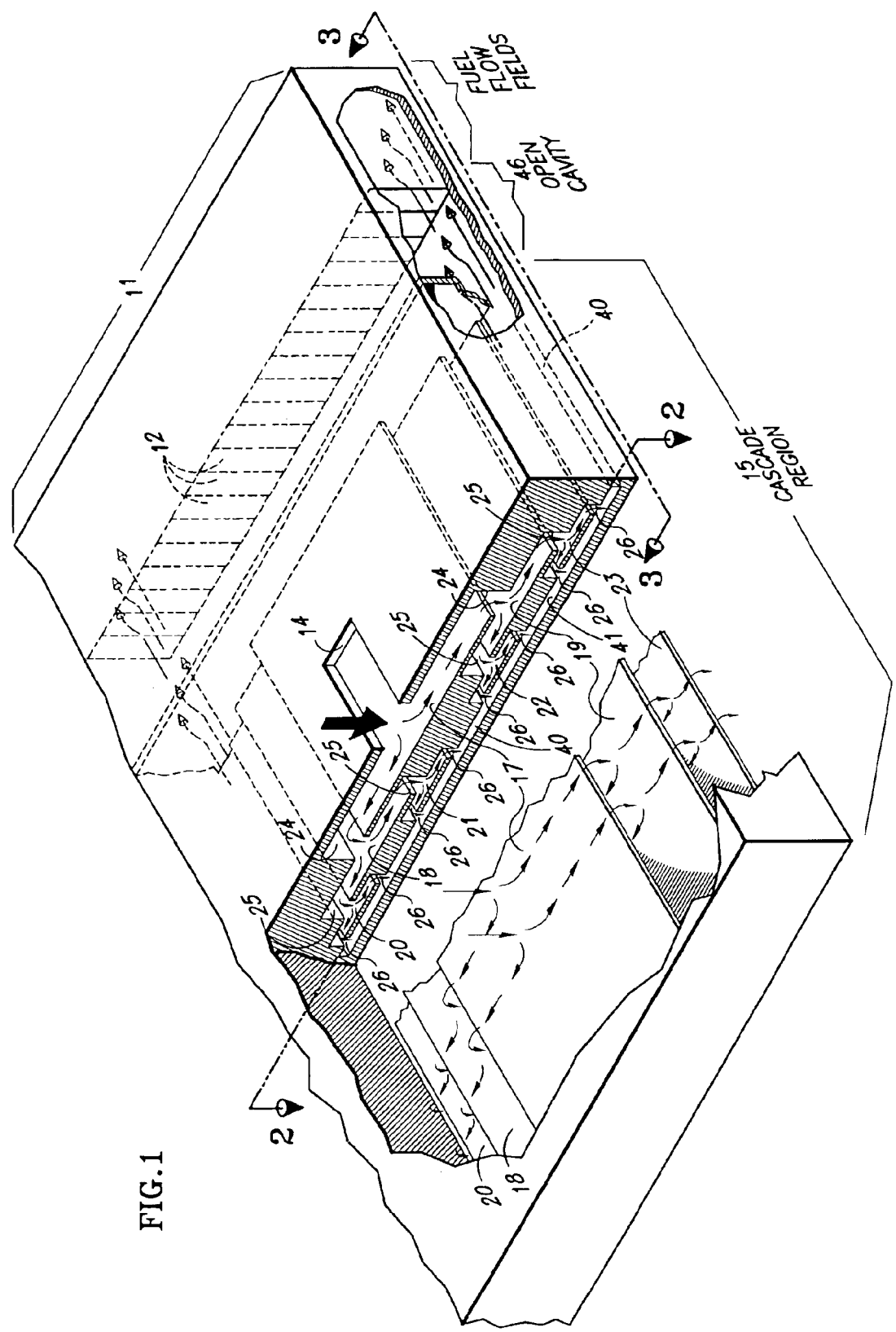
FIG. 1 is a partially sectioned, partially broken away perspective view of one embodiment of a cascade fuel inlet manifold according to the present invention.

Referring to FIG. 1, a plurality of fuel cells are arranged contiguously within a fuel cell stack 11. Each of the fuel cells has a fuel flow field 12 which receives fuel reactant gas and distributes it throughout each fuel cell. The fuel flow fields 12 illustrated in FIG. 1 may represent only a fraction of the fuel flow fields of each fuel cell stack, there may be a turnaround manifold (not shown) to the upper right of FIG. 1, receiving fuel reactant gas flowing through the flow fields 12, and there may be additional fuel flow fields, one for each fuel cell, disposed beneath those illustrated in FIG. 1, the fuel flowing outwardly therefrom into a fuel exit manifold disposed toward the lower left of the illustration of FIG. 1. The nature of the fuel flow fields and the arrangement of the fuel exit manifolding is irrelevant to the present invention.

In FIG. 1, fuel is introduced through an inlet 14 of a cascade region 15, the fuel being provided to the inlet 14 by a conventional fuel conduit. The cascade region 15 has a plurality of stages or plateaus 17–23, each of which has an upper surface which terminates in a pair of corresponding passages, such as slots 24–26. As shown by the small flow arrows in FIG. 1, on each plateau 17–23 of the cascade, the flow splits so that substantially half of it will flow toward each of the slots 24–26 at the edge of the corresponding plateau. This causes the flow to be spread across a cascade exit surface which comprises a floor surface 41 of a cascade exit header 40, which extends throughout the area below the cascade region 15 as seen in FIG. 1, and is in fluid communication with each of the slots 26.

Figure 2:
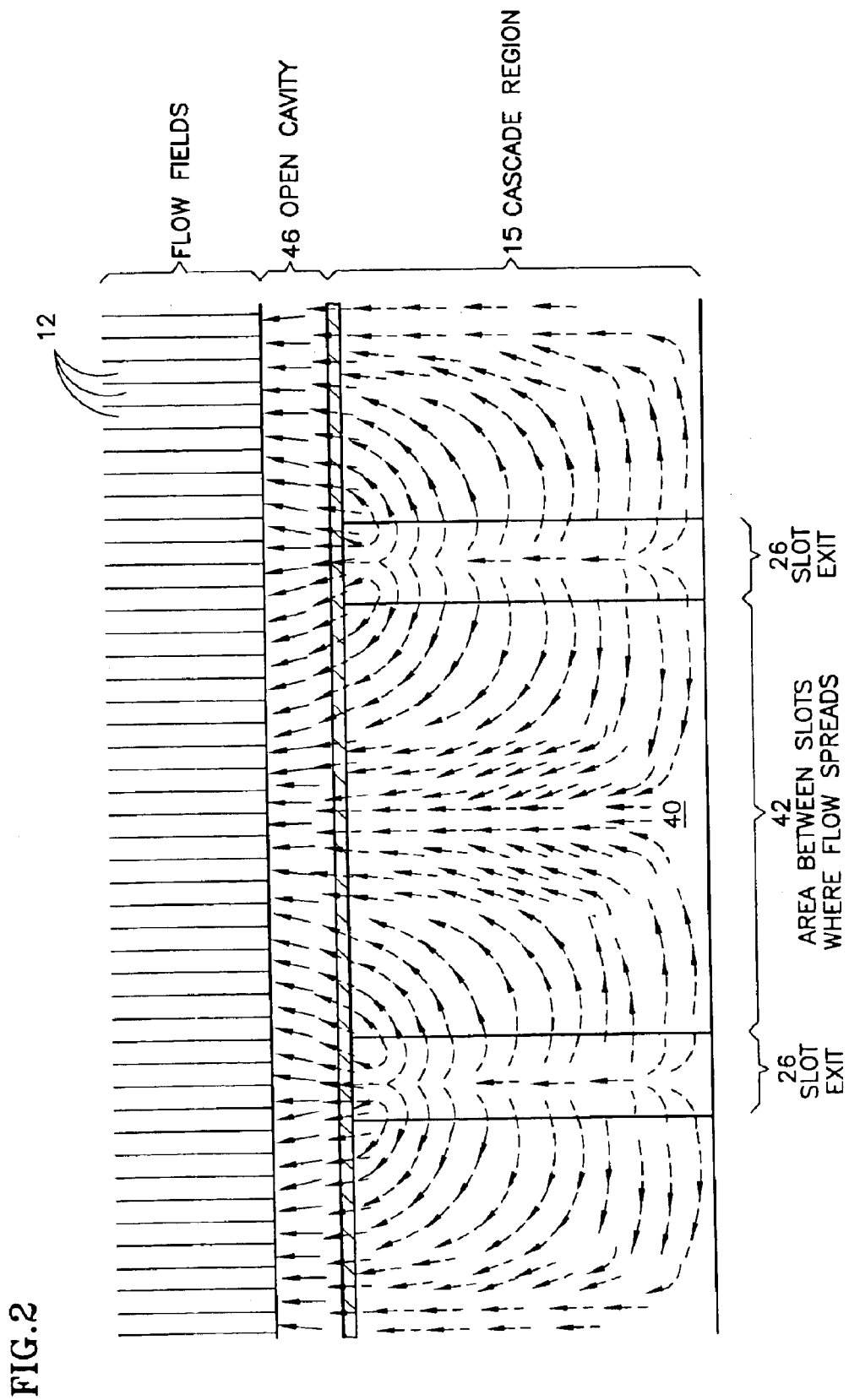
FIG. 2 is a stylized, idealized schematic diagram of fuel flow, taken approximately on the line 2—2 of FIG. 1.
Figure 3:
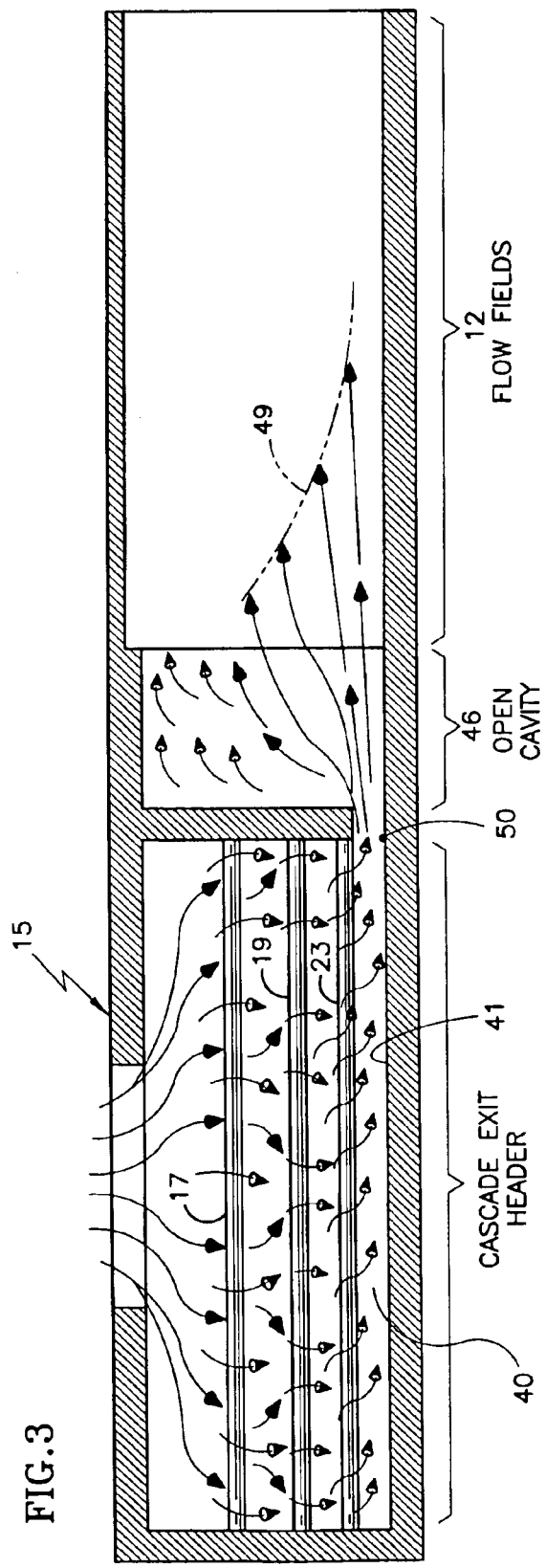
FIG. 3 is a simplified, stylized illustration of fuel flow taken approximately on the line 3—3 in FIG. 1.

The flow, being directed downward toward the floor surface 41 of the cascade exit header 40, spreads into areas between the slots, as is illustrated in FIG. 2. In FIG. 2, the flow exiting any one of the slots 26 spreads out, flowing to the right and left as seen in FIG. 2 (to the upper left and lower right as seen in FIG. 1), as well as flowing upwardly in FIG. 2 (to the upper right as seen in FIG. 1), toward an open cavity 46. Referring to FIG. 3, the flow from the cascade exit header 40 is to the right into the open cavity 46. The flow is evenly distributed from the upper left to the lower right as seen in FIG. 1, as the flow enters the open cavity 46 (FIG. 3). The flow will then enter the lower channels of the flow fields 12 as well as flowing upwardly in the open cavity 46 so as to enter upper channels of the flow fields 12. As an initial flow of fuel is passed through the cascade region, the cascade exit header and the open cavity 46, into the flow fields 12, it may form a fuel/air (or fuel/inert gas) interface, somewhat as shown by the dot/dash line 49 in FIG. 3. The fact that each fuel cell does not have the same degree of fuel penetration in all areas of its own flow field is irrelevant; what is important is that all of the fuel cells have the same degree of penetration (such as illustrated by the dot dash interface line 49) at any point in time, and that such degree of fuel penetration occurs simultaneously in all fuel cells.

In FIG. 1, the initial flow distribution within the cascade region 15 splits the flow a number of times, with each path being equal in length and geometry so that the flow rates and pressure drops are substantially the same, and the arrival time of the fuel/air interface during startup, or change in fuel flow rate during transient conditions, is substantially simultaneous at each of the cascade outlet slots 26. In the orientation of the cascade region 15 shown in FIG. 1, liquid water in the fuel flow is not able to collect in the passages and create non-uniformities in the flow cross section, and therefore in the flow distribution. However, if desired in certain utilizations of the present invention, the cascade region 15 could be oriented in a manner which is normal to that shown in FIG. 1; this may be visualized by thinking that the cascade region 15 is rotated 90° counterclockwise about a pivot point 50 in FIG. 3. However, if the exit slots 26 were to flow the fuel directly into the open cavity 46, then the open cavity 46 would have to be provided with a baffle (similar to the floor surface 41) or the depth of the cavity 46 would have to be increased significantly in order to get the desired spreading that is provided by the floor surface 41 in the embodiment shown herein.

In the example herein, the cascade has three stages; evenly dividing the flow seven times, yielding eight flows. However, two (or more than three) stages, yielding four (or more than eight) flows may be used if desired. If FIG. 1 only represents a fraction of the inlet side of the fuel flow fields, the balance being to the upper left of FIG. 1, an initial stage will split the flow so that some fraction of it enters the inlet 14 (and similarly for the other portion).

The present invention causes the fuel/air (or fuel/inert gas) interface, and other changes in the fuel flow, to arrive at the inlets of the fuel flow fields of all of the fuel cells simultaneously. This means that the differences between electrical activity within each of the fuel cells will be dependent upon the characteristic of the individual fuel cells, rather than on the fact that one fuel cell has received a greater change in the quantity of fuel than other fuel cells. This in turn allows the electrical potential of all of the cells to be more uniformly controlled, while at the same time minimizing any damage to the individual fuel cells, decreasing variations of performance, improving transient capability, and significantly increasing fuel cell life. In most applications, the present invention provides sufficient control over relative voltages of the fuel cells during startup so that an inert gas purging of the fuel flow fields need not be undertaken. Flow impingement on the various plateaus of the cascade improves uniform spreading of the fuel in the dimension parallel to the slots, while at the same time the cascade is spreading the fuel quite uniformly in the dimension normal to the slots. Impingement of the fuel on the floor surface 41 of the cascade exit 40 (FIG. 3) spreads the fuel in dimensions not parallel with the slots. The cascade and the header prevent "jetting" of the flow due to sudden expansions. At start up, jetting tends to mix the fuel and the air volumes at the fuel/air interface, which creates heat and excessive voltages, and which creates a safety hazard due to the combustible nature of the mixture. During operation with a conventional manifold design, transient conditions result in flow mal-distribution at the fuel flow inlets. The mal-distribution can cause cell performance degradation. However, with the manifold of this invention, uniform flow to all the fuel flow field inlets is maintained during transient conditions.

The fuel inlet manifold of the invention may be used with fuel cell stacks other than PEM fuel cell stacks.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell stack having an array of contiguous fuel cells, each fuel cell having a fuel flow field with a flow field inlet, said stack including a fuel inlet manifold system comprising:

a cascade region having a series of stages, each stage having a flat surface terminating in passages at opposite edges of said flat surface, each passage of each stage except the last in said series directing fuel to the flat surface of a next stage in said series, the passages of the last stage in said series directing fuel onto a flat cascade exit surface so that fuel is spread in dimensions not parallel with said passages; and an open cavity disposed between said flow field inlets and said cascade exit surface.

2. A fuel cell stack having an array of contiguous fuel cells, each fuel cell having a fuel flow field with a flow field inlet, comprising:

means for providing a flow of fuel from a source;

means for successively dividing the flow of fuel substantially equally into two substantially simultaneous flows, a number, n, of times, to provide n+1 flows, said number being at least three; and means for spreading the fuel from said n+1 flows to provide a single, substantially uniform flow of fuel to said flow field inlets.

3. A method of providing fuel to a fuel cell stack having an array of contiguous fuel cells, each fuel cell having a fuel flow field with a flow field inlet, said method comprising:

providing a flow of fuel from a source;

successively dividing the flow of fuel substantially equally into two substantially simultaneous flows, a number, n, of times, to provide n+1 flows, said number being at least three; and spreading the fuel from said n+1 flows to provide a single, substantially uniform flow of fuel to said flow field inlets.

* * * * *